United States Patent [19]
Duerksen et al.

[11] 3,793,099
[45] Feb. 19, 1974

[54] SOLID PROPELLANT WITH POLYURETHANE BINDER

[75] Inventors: Robert L. Duerksen, Pomona; Joseph Cohen, Carmichael, both of Calif.

[73] Assignee: Aerojet-General Corporation, Azusa, Calif.

[22] Filed: May 31, 1960

[21] Appl. No.: 33,054

[52] U.S. Cl.................. 149/19, 149/20, 149/38, 149/44
[51] Int. Cl................................................. C06d 5/06
[58] Field of Search........ 52/0.5; 149/19, 20, 60, 76, 149/83, 44

[56] References Cited
UNITED STATES PATENTS

| | | | |
|---|---|---|---|
| 3,022,149 | 2/1962 | Cramer | 149/76 X |
| 2,926,613 | 3/1960 | Fox | 52/0.5 S X |
| 2,857,258 | 10/1958 | Thomas | 52/0.5 S |
| 2,597,641 | 5/1952 | Hull et al. | 52/0.5 S UX |
| 2,988,876 | 6/1961 | Walden | 52/0.5 S X |
| 2,990,683 | 7/1961 | Walden | 52/0.5 S X |
| 2,970,898 | 2/1961 | Fox | 52/0.5 S |
| 3,002,830 | 10/1961 | Barr | 52/0.5 S |
| 2,941,010 | 6/1960 | Mann | 52/0.5 S X |
| 3,004,840 | 10/1961 | Pruitt et al. | 52/0.5 S |

OTHER PUBLICATIONS

Missles and Rockets, Vol. 5, No. 18, May 4, 1959, pg. 11.
Zaehringer, Missles and Rockets, Vol. 4, No. 6, Aug. 11, 1958, pages 32 and 34.
Zaehringer, Missles and Rockets, Vol. 5, No. 2, Jan. 12, 1959, pages 16 and 17.
Zaehringer, Missles and Rockets, Vol. 5, No. 7, Feb. 16, 1959, pages 33.
Chem. and Eng. News, Jan. 1958, p. 79, 80.
Zaehringer, Solid Propellant Rockets, Second Stage, Sept. 1958, American Rocket Co., Wyandotte, Mich., pages 203–219.

*Primary Examiner*—Benjamin R. Padgett
*Attorney, Agent, or Firm*—Edward O. Ansell

EXEMPLARY CLAIM

1. A solid substantially homogeneous propellant composition which comprises a cured intimate mixture of finely divided aluminum, which is uniformly dispersed throughout said propellant composition a solid inorganic oxidizing salt, and a polyurethane resin binder which comprises the reaction product of an aromatic diisocyanate, a polyether having a molecular weight between about 400 and about 10,000, and a trihydroxy cross-linker compound; the aluminum being present in an amount between about 5 and about 40 percent by weight, the resin binder being present in an amount between about 40 and about 10 percent by weight, and the solid inorganic oxidizing salt being present in an amount between about 85 and about 40 percent by weight, all percentages being given on a total propellant weight basis.

21 Claims, No Drawings

SOLID PROPELLANT WITH POLYURETHANE BINDER

This invention relates to novel solid propellant compositions and in particular to novel propellant compositions comprising a cross-linked polyurethane binder, aluminum, and a finely divided oxidizing agent.

Solid propellant compositions are ordinarily composed of a resin fuel and an oxidizing material, the oxidizing material being intimately dispersed in the fuel. The ignition and burning properties of each propellant composition as well as the physical properties are dependent to a large extent upon the particular resins employed as fuels. In the novel propellant compositions of this invention, cross-linked polyurethanes are used as the resin fuel component to produce propellants of unexpected superior physical properties and performance characteristics. In addition, our novel propellant compositions contain metallic aluminum which when present in sufficient quantity results in relatively high specific impulse such as, for example, an impulse of from 220–270 lbf-sec/lbm at 1,000 psia.

It is a principal object of our invention to provide solid propellants of high specific impulse and superior mechanical properties.

The novel polyurethane-aluminum propellants of our invention can be cured at low temperatures and in addition exhibit no measurable heat of reaction. As a result of these unique properties they are not subject to shrinkage and hence have substantially no internal strains. Composite propellant systems other than polyurethane propellant systems have all been severely restricted in their use because of high heats in reaction and the need for high cure temperatures which produce shrinkage and internal stresses. These faults have heretofore imposed severe restrictions upon the size of solid propellant motors because of their tendency to crack as a result of such internal stresses. The novel propellants of this invention are not subject to such size limitations because of the use of cross-linked polyurethanes as the resin fuel component thereof and, in addition, they have relatively high-specific impulse due to the presence of aluminum.

In addition to their freedom from cracking and high-specific impulse, the novel polyurethane aluminum propellants of this invention are possessed of sufficient tenacious adhesive properties to enable them to be bonded directly to rocket chamber linings, thus permitting optimum utilization of the available space in the rocket motor and simplifying manufacturing techniques. Our novel propellants are also possessed of many other desirable properties among which are rubbery mechanical qualities, low brittle point, excellent resilience, and superior aging properties.

Our novel solid propellants can be used as the primary propulsion source in rocket-propelled vehicles or as a propellant for artillery missiles. When used as the primary propulsion source for rocket vehicles, they can be conveniently ignited by a conventional igniter as, for example, the igniter disclosed in assignee's copending patent application Ser. No. 306,030, filed Aug. 23, 1952. The propellant is preferably cast directly in the rocket chamber in which it is to be fired and restricted on one or both ends in the conventional manner with a relatively slow burning inert resin such as a polyurethane or a polyester resin. The restriction is preferably accomplished by applying a relatively thin coating of the inert resin to the inner surfaces of the rocket chamber lining prior to casting the propellant therein. Rocket chambers such as those in which our novel solid propellants are employed are ordinarily of the conventional type having one end open and leading into a venturi rocket nozzle. Upon ignition, large quantities of gases are produced and exhausted through the nozzle creating propulsive force.

The polyurethane binders of our invention are prepared by reacting a compound having two or more active hydrogen groups capable of polymerizing with an isocyanate with an organic compound having as the sole reacting groups two or more isocyanate or isothiocyanate groups. The compound having the active hydrogen groups is preferably an organic compound having as its sole reacting groups hydroxyl or thiol groups.

It will be apparent that, where there are more than two active hydrogen, isocyanate, or isothiocyanate groups present on any of the polyurethane reactants, the resulting molecular structure of the polyurethane binder will be at least to a certain extent of a cross-linked rather than a linear nature. The cross-linking is accomplished when all three functional groups of a sufficient number of the trifunctional molecules undergo the urethane reaction with other groups present in the mixture, thus resulting in a product having a "three-dimensional" molecular structure rather than mere aggregates of linear chains as is the case when bifunctional reactants are employed.

Where bifunctional reactants, such as dihydroxy compounds and diisocyanates, are employed to produce the polyurethane binders for our novel propellants, it is necessary to also employ a "cross-linking" agent to assure a product having the cross-linked structure essential to this invention. Cross-linking agents can also be used with polyurethane reactants having more than two functional groups, such as triols and/or triisocyanates, within the scope of this invention. Compounds suitable as cross-linking agents for our polyurethane binders are those organic compounds having as the sole reacting groups three or more groups polymerizable with hydroxy or isocyanate groups.

It will be appreciated that in any given batch of propellant the individual polyurethane molecules may vary in number of repeating units from several to tens of thousands of these units, hence molecular weight figures on polyurethanes represent statistical averages. The exact nature of terminal groupings is not known and will vary depending upon whether plasticizers, polymerization catalysts, etc., are present. Moreover, a given molecule may even form a ring and thus leave no dangling radicals.

It is evident from the above that a wide variety of polyurethane binders for the propellants of this invention can be prepared by varying the particular isocyanate and hydroxy starting materials.

The isocyanate starting materials for our polyurethane binders are preferably diisocyanates but not necessarily so since, as explained above, other polyisocyanates (such as triisocyanates) or polyisothiocyanates may be employed within the scope of the invention if desired.

Our preferred diisocyanate compounds can be saturated or unsaturated; aliphatic or aromatic; open or closed chain, and, if the latter, monocyclic or polycyclic; and substituted or not by groups substantially unreactive with isocyanate or hydroxyl groups such as, for example, ketone, halogen, ester, sulfide, or ether groups. The following diisocyanate compounds are particularly suitable as reactants for the preparation of binders for our novel polyurethane propellants:

a. Alkane diisocyanates such as ethylene diisocyanate; trimethylene diisocyanate; propylene-1,2-diisocyanate; tetramethylene diisocyanate; butylene-1,3-diisocyanate; decamethylene diisocyanate; octadecamethylene diisocyanate; etc.

b. Alkene diisocyanates such as 1-propylene-1,2-diisocyanate; 2-propylene-1,2-diisocyanate; 1-butylene-1,2-diisocyanate; 3-butylene-1,2-diisocyanate; 1-butylene-1,3-diisocyanate; 1-butylene-2,3-diisocyanate; etc.

c Alkylidene diisocyanates such as ethylidene diisocyanate; propylidene-1,1-diisocyanate; propylidene-2,2-diisocyanate; etc.

d Cycloalkylene diisocyanates such as cyclopentylene-1,3-diisocyanate; cyclohexylene-1,3-diisocyanate; cyclohexylene-1,2-diisocyanate; cyclohexylene-1,4-diisocyanate; etc.

e Cycloalkylidene diisocyanates such as cyclopentylidene diisocyanate; cyclohexylidene diisocyanate; etc.

f Aromatic diisocyanates such as m-phenylene diisocyanate; o-phenylene diisocyanate; p-phenylene diisocyanate; 1-methyl-2,4-phenylene diisocyanate; naphthylene-1,4-diisocyanate; diphenylene-4,4'-diisocyanate; 2,4-tolylene diisocyanate; 2,6-tolylene diisocyanate; 4,4'-diphenylmethane diisocyanate; 1,5-naphthalene diisocyanate methylene-bis-(4-phenylisocyanate); 2,2-propylene-bis-(4-phenylisocyanate); xylylene-1,4-diisocyanate; xylylene-1,3-diisocyanate; 4,4'-diphenylenemethane diisocyanate; 4,4'-diphenylenepropane diisocyanate; 2,3-pyridine diisocyanate; etc.

g. Other diisocyanates suitable in the practice of this invention include diisocyanates containing hetero-atoms such as $OCN-CH_2CH_2-O-CH_2CH_2-NCO$; etc.

The preferred hydroxy starting materials for our polyurethane binders are dihydroxy compounds having the general formula HO-R-OH; where R is a divalent organic radical. The hydroxy groups on the above compounds can be of any type suitable for the urethane reaction with isocyanate groups such as, for example, alcohol or phenolic hydroxy groups. The following dihydroxy compounds are particularly suitable as reactants for the polyurethane binders of this invention;

1. Alkane diols having a chain length of from 2 to 20 carbon atoms, inclusive, such as 2,2-dimethyl-1,3-propanediol; ethylene glycol; tetramethylene glycol; hexamethylene glycol; octamethylene glycol; decamethylene glycol; etc.

2. Alkene diols such as 1-propylene-1,2-diol; 2-propylene-1,3-diol; 1-butylene-1,2diol; 3-butylene-1,2-diol; 1-hexylene-1,3-diol; 1-butylene-2,5-diol; etc.

3. Cycloalkylene diols such as cyclopentylene-1,3-diol; cyclohexylene-1,2-diol; cyclohexylene-1,3-diol; cyclohexylene-1,4-diol; etc.

4. Aromatic diols such as catechol; resorcinol; quinol; 1-methyl-2,4-benzenediol; 2-methyl-1,3-naphthalenediol; 2,4-toluenediol; xylylene-1,4-diol; xylylene-1,3-diol; 1,5-naphthalenedimethanol 2-ethyl-1-phenyl-3-butene-1,2-diol; 2,2-di(4-hydroxyphenyl)-propane; 6-methyl-2,4-pyrimidinediol; etc.

5. Other diols suitable in the practice of this invention include diols containing hetero-atoms such as di(β-hydroxyethyl) ether;

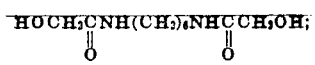

etc.

Other dihydroxy compounds suitable for the polyurethane reaction of this invention are polyesters such as those obtained from the reaction of a dihydric alcohol such as ethylene glycol, diethylene glycol, propylene glycol, butylene glycol, or hexamethylene glycol with a dicarboxylic acid such as succinic acid, adipic acid, sebacic acid, oxadibutyric acid, sulfodipropionic acid, and related compounds. The polyesters most suitable for purposes of this invention are those having a molecular weight from about 1,000 to about 2,500. In preparing polyesters such as these, the dihydric component is permitted to react with the dicarboxylic acid component to produce the polyester. Mixtures of polyesters and an olefin such as styrene, vinyl acetate, or the like, are particularly suitable for purposes of this invention. The olefin does not react with any of the hydroxy groups present in the mixture, nor does it interfere in any way with the subsequent reaction between these hydroxyl groups and the isocyanate groups in the polyurethane reaction mixture. Neither does it interfere with any reactions of cross-linking agents present in the mixture. The principal function of the olefin is to permit linkage of the polyester molecules together through addition polymerization.

The above-mentioned polyesters can be prepared from either saturated or unsaturated dihydric alcohols and saturated or unsaturated dicarboxylic acids. The anhydrides of any of the dicarboxylic acids can be substituted for all or part of any of them in the preparation of polyesters suitable for the polyurethane reaction of our invention. The usual and preferred manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are maleic acid, fumaric acid, citraconic acid, mesaconic acid, itaconic acid, etc.

In addition to the polyesters, polyethers such as polyethylene ether glycols, polypropylene ether glycols, other polyalkylene ether glycols, and mixtures or copolymers thereof having molecular weights of from about 400 to about 10,000 can be utilized as dihydroxy reactants of the polyurethane reaction of this invention.

Polysulfides having two or more thiol groups, such as ethylene disulfide and the Thiokols produced by Thiokol Corporation, and polysulfides with glycol end groups such as those having the general formula $HO(CH_2-CH_2-S-S)_x-CH_2CH_2OH$, where $x$ is a whole number, are other suitable reactants for the polyurethane reaction of our invention.

It will be appreciated by those skilled in the art that mixtures of suitable polyhydroxy and/or polyisocyanate compounds can be used for purposes of this invention if desired.

It is well-known to those skilled in the art that polyisothiocyanates and polythiol compounds react to yield urethanetype products as do the polyisocyanates and polyol compounds. Consequently, the polyisothiocyanates and polythiols corresponding to any of the polyisocyanates or polyhydroxy compounds taught herein can be employed for the preparation of propellant binders useful in this invention. For example, diisothiocyanates such as butylene-1,3-diisothiocyanate; ethylidene diisothiocyanate; cyclohexylene-1,2-diisothiocyanate; cyclohexylidene diisothiocyanate; p-phenylene diisothiocyanate; and xylylene-1,4-diisothiocyanate; etc., react with dithiol compounds such as decamethylene dithiol; thioresorcinol; ethylene bis-(thioglycolate); etc., to yield polythiourethane compounds which are suitable as binders for our novel propellant compositions. Any mixture of the diisocyanates and/or diisothiocyanates suitable as reactants for the propellant binders of this invention can be reacted with any mixture of diols and/or dithiols disclosed as suitable for the purpose within the scope of our invention.

It will be appreciated by those skilled in the art that a great variety and number of polyfunctional organic compounds will serve as cross-linking agents for the polyurethane binders of this invention. As indicated above, any organic compound having as its sole reacting groups three or more groups polymerizable with hydroxy or isocyanate groups is a suitable cross-linking agent for purposes of this invention. This includes not only the obvious polyfunctional hydroxy, thiol, isocyanate, and isothiocyanate compounds but also compounds containing other groups polymerizable with either hydroxy or isocyanate groups. For example, compounds with three or more groups containing reactive hydrogen which are capable of polymerization with isocyanates can be employed as cross-linking agents within the scope of this invention. Examples of compounds of this class are proteins and synthetic polyamides such as polyhexamethylene adipamides. The cross-linking agents of this invention can be saturated or unsaturated; aliphatic or aromatic; open or closed chain; and, if the latter, monocyclic or polycyclic; and substituted or not by groups substantially unreactive with isocyanate or hydroxyl groups such as, for example, ketone, halogen, ester, sulfide, or ether groups.

Examples of compounds which we have found to be particularly suitable as cross-linking agents are glycerol monoricinoleate; glycerol triricinoleate (sometimes referred to as GTRO); 1,2,6-hexanetriol; methylene bis-(orthochloroaniline); monohydroxyethyl trihydroxypropyl ethylenediamine; polyaryl polyisocyanates; pentaerythritolpropylene oxide adduct; N,N,N', N'-tetrakis (2-hydroxypropyl) ethylenediamine; triethanolamine; trimethylolpropane; and triisocyanates, such as toluene-2,4,6-triisocyanate.

Other substances suitable as cross-linking agents are glycerol, sorbitol, dextrin, starch, cellulose, ethyl cellulose, cellulose acetate, polyvinyl acetals, polyvinyl ketals, polyvinyl alcohol, diethylenetriamine, polyvinyl mercaptans, and shellac.

As in the case of the polyurethane reactants, mixtures of the various cross-linking agents can be employed within the scope of this invention.

The aluminum component of our novel propellants is preferably in finely divided form. However, our invention is not limited to the use of finely divided aluminum and coarse aluminum particles such as, for example, those obtained by chopping aluminum wires into pieces can be employed within the scope of the invention if desired.

Where finely divided aluminum is used for purposes of this invention, the particle size of the aluminum is not critical but we have observed that its combustion efficiency tends to decrease to a certain extent as the particle size increases above about 25 $\mu$. Below 25 $\mu$, no such effect has been observed and consequently the preferred particle sizes for our novel propellants are those of about 25 $\mu$ and below.

The aluminum powders presently available are generally comprised of either spherical particles or plate-shaped ones. We have found the former to be more desirable for our purposes since they are possessed of higher purity and contribute to more favorable rheological properties in the propellant mix. The plate- or flake-shaped particles interlock to a certain extent in the semifluid propellant mixes, as a result of which there is a tendency toward poor distribution of the aluminum particles therein and this has an adverse effect on the rheological properties of the system.

Examples of aluminum powders having spherical-shaped particles suitable for purposes of this invention are those commercially available under the trade names Alcoa 101, Alcoa 120, Alcoa 123, Reynolds 1-511, and Reynolds 400; the first three being products of Aluminum Co. of America, Pittsburgh, Pa., and the latter two being products of Reynolds Aluminum Company. An example of a commercially available aluminum powder having flake-shaped particles is Alcoa 606 produced by Aluminum Co. of America.

The spherical-shaped aluminum particles are normally manufactured by atomizing (nozzle-spraying of molten aluminum) means and the flake-shaped particles by ball-milling. The particle sizes of the above aluminum powders are tabulated below:

| PRODUCT | PARTICLE SIZE |
|---|---|
| Spherical-Shaped | |
| Alcoa 101 | (44–210 $\mu$, 20%) |
|  | (<44 $\mu$, 80%) |
| Alcoa 120 | *70 $\mu$ |
| Alcoa 123 | *25 $\mu$ |
| Reynolds 1-511 | *25 $\mu$ |
| Reynolds 400 | *8 $\mu$ |
| Flake-Shaped | |
| (Flake Thickness is Usually 2.0 $\mu$ or Less) | |
| Alcoa 606 | (>210 $\mu$, 0.2%) |
|  | (44–210 $\mu$, 9.8%) |
|  | (<44 $\mu$, 90.0%) |

*Average particle size as determined by the micromerograph method. This method is based on Stoke's Law of the rate of sedimentation of a spherical particle in a fluid medium $v=2r^2g(d-d_m)/9n$, where
$v$=equilibrium velocity at which the friction force equals the force of gravitation
$r$=radius of particles
$g$=gravitational acceleration
$d$=density of particle
$d_m$=density of fluid medium
$n$=viscosity of the medium
Therefore, the determination of the equilibrium velocities of particles in a heterogeneous mixture gives the particle size, and the rate at which fractions travel through a fixed distance gives the distribution from which the average particle size is calculated.

The oxidizers employed in the propellants of this invention can be any solid inorganic oxidizing salt well-known to those skilled in the art. Examples of suitable oxidizing salts are the chromates, dichromates, permanganates, nitrates, chlorates, and perchlorates of the alkali or alkaline earth metals (such as potassium, sodium, or calcium); ammonia; hydrazine; or guanidine.

The selection of the oxidizing salt depends upon the specific burning properties desired in the propellant grain. Thus, where a low smoke propellant is desired a nonmetallic oxidizing salt such as ammonium perchlorate or ammonium nitrate should be employed rather than an oxidizing salt containing a metal such as sodium nitrate, potassium perchlorate, or calcium chlorate. Mixtures of suitable inorganic oxidizing salts can be used within the scope of this invention.

Various additives may be employed in preparing the polyurethane binders of this invention. For example, plasticizers familiar to those skilled in the art such as isodecyl pelargonate; 4-nitrazapentanonitrile; 2,2-dinitropropyl-4-nitrazapentanoate; dioctyl azelate; etc.; as well as those commercially available as such, may be utilized. Also, catalysts for the polyurethane reaction such as triethylamine and other tertiary amines; ferric acetylacetonate and other metal acetylacetonates such as vanadyl acetylacetonate, etc.; boron trifluoride, etc.; can be employed if desired. The catalysts can be employed in quantities within the range from mere traces up to amounts equivalent to about one percent by weight of the total mass and even higher. Normally amounts of from about 0.02 to about 0.10 percent by weight, on a total weight basis, are employed.

The polymerization reaction may be carried out either in a suitable solvent or in the absence of a solvent. The solvent may be present in such great excess as to form a solution of the monomers or it may be used in relatively small quantities. Suitable solvents are those in which the various ingredients of the reactant mixture are soluble such as 4-nitrazapentanoate, dioxan, dimethylphthalate, etc.

Burning rate modifiers and other additives such as antioxidants, wetting agents, antifoaming agents, etc., can be employed, if desired, in the formulation of our novel propellants. In this connection, we have discovered that copper chromite, such as the Harshaw Chemical Company product known as Cu 0202, and finely divided carbon black, such as that designated by R. T. Vanderbilt Company as P-33, when utilized in small quantities (comprising preferably not greater than about 2 percent and for best results not greater than about 1 percent of the total propellant weight) are useful for increasing the burning rate of the propellant. We have also found certain well-known wetting agents such as lecithin to be useful processing aids in the preparation of our novel propellants. A wetting agent which we have found to be particularly suitable for our purpose is that known commercially as G-2684. G-2684 is a mexture of sorbitan monooleate and polyoxyethylene esters of mixed fatty and resin acids, manufactured by Atlas Powder Company of Wilmington, Del. For best results, we have determined that wetting agents should be employed in proportions comprising not more than about 1 percent by weight of the total propellant composition and preferably in proportions much lower than this. Various additives other than those mentioned can be employed in minor amounts within the scope of our invention. For example, phenyl betanaphthylamine or N-N',-di-β-naphthyl-p-phenylenediamine can be utilized in very small amounts as an antioxidant.

In preparing the novel propellants of this invention, the polyurethane polymerization can be conducted at any temperature, the only effect of temperature variation being a corresponding increase or decrease in the rate of reaction. The polymerization readily takes place at room temperature but higher temperatures increase the rate of reaction and are therefore desirable in many cases. As explained above, however, temperatures lower than as well as higher than room temperature can be used for our polymerization reaction.

Because higher temperatures tend to produce shrinkage and internal strains it is preferable to carry out the cure at temperatures in the range of from about 70° to about 180°F. Within this range the reaction rate is sufficiently rapid for economical production and yet the temperature is not so high as to produce shrinkage and internal stresses which must be avoided at all costs, especially in the case of large solid propellant motors.

Those skilled in the art will appreciate the fact that heating and cooling steps can be incorporated into our propellant processing procedure for various reasons such as for the attainment of optimum operating conditions, if desired. Likewise, various other techniques which serve to optimize the processing procedure or improve the quality of the product (such as vacuumizing the mixture during certain phases of the operation) can be employed in the practice of this invention if desired.

The various processing steps of this invention can be carried out with standard equipment well-known to those skilled in the art as suitable for the purpose. A mixer which we have found to be particularly effective for mixing our propellant ingredients, however, is that known commercially as the P mixer. The P mixer is manufactured by Baker-Perkins, Inc., of Saginaw, Mich., and it can be equipped with facilities for heating, cooling, and vacuumizing propellant batches during mixing for use where such facilities appear to be warranted.

There are many ways of processing the various ingredients within the scope of this invention in the formulation of propellants therefrom. In general, however, we have found it preferably to add the aluminum to one or more of the liquid binder components of the system prior to incorporating the oxidizer and other ingredients therein, the principal reason for this being one of safety. Powdered aluminum is known to be explosive in the presence of oxygen and a hazard is created where aluminum is permitted to contact a dry oxidizing material. Our preferred method of aluminum addition precludes its contact with the dry oxidizer and hence there is substantially no danger of explosion when this procedure is followed. Where the polyurethane reactants are diols and diisocyanates and the cross-linkers are polyhydroxy compounds, the diol can be first mixed with the cross-linker and the aluminum added to the liquid mixture, after which the inorganic oxidizer and the diisocyanate can be stirred or otherwise mixed into the mass. Catalysts and/or other additives can be introduced into the mixture prior to or at the same time as the addition of the diisocyanate or subsequent to this addition. The various additives do not all have to be added at the same stage of processing and, in fact, it has been found preferable in most cases to deviate from this procedure.

One technique which we have found to be quite satisfactory (where the major ingredients and order of addition of these ingredients are as described above) comprises addition of the wetting agent or agents, along with the plasticizer, to the diol, aluminum, and cross-linker in the mixer; addition of the burning rate modifiers (such as copper chromite and carbon black) during addition of the inorganic oxidizer; and addition of the curing catalyst (such as ferric acetylacetonate) along with addition of the diisocyanate. Modifications of the above methods of introducing the additives such as, for example, addition of the wetting agents to the diol prior to introduction into the mixer are varied and many. Likewise, there are many techniques for processing the major components in the preparation of our novel propellants. For example, the diol can first be mixed with the aluminum and then with the inorganic oxidizer, after which the diisocyanate can be added, along with the catalyst and cross-linker.

After the polyurethane propellant batch has been mixed to substantial uniformity, it is cast, extruded, or compression-formed to the desired shape and cured at a temperature preferably within the range from about 70° to about 180°F. As pointed out above, the propellant mixture can be cast directly into a rocket chamber lined with an inert liner material and polymerized (cured) therein if this procedure appears to be desirable.

From about 5 to about 40 weight percent of aluminum, based on the total weight of the final propellant, is preferably employed in the preparation of our novel solid propellants. The binder is preferably employed in a proportion within the range from about 40 to about 10 percent and the oxidizer within the range from about 85 to about 40 percent by weight. It is evident that, since the proportion of oxidizer in our propellants should preferably never be lower than about 40 percent, the combined amounts of binder and aluminum should preferably never exceed about 60 percent of the total propellant weight. To express the same thing in another way, the weight ratio of oxidizer to binder plus aluminum in our propellants should preferably never drop below about 40:60, or about 2:3. This is true because all ratios lower than about 2:3 normally result in an oxygen deficiency of sufficient seriousness to prevent practical use of the resulting product as a propellant.

The above-stated proportions of ingredients are applicable insofar as our preferred polyurethane propellants are concerned. However, our invention is not limited in application to propellants in which the binder is a polyurethane system of the above-described type. As will be apparent from the remainder of our specification, this invention constitutes an improvement in solid propellants in general regardless of the particular binders employed. Thus, propellants containing high energy binders such as nitro-containing polyurethanes or the like, in which little or no oxidizing salt need be present, as well as oxygen deficient propellants contemplated for use in hybrid rocket systems in which additional oxygen is supplied by a liquid oxidizer, when improved by the addition of aluminum as taught herein, are within the scope of our invention. In view of the wide variety of binder systems in the improved propellants of our invention, it is clear that the above-stated ranges of binder and oxidizer proportions could not possibly be applicable to all of our propellant formulations. This is particularly borne out by the fact that, as indicated above, some of our improved propellants contain no oxidizing salt at all.

While polyurethane binders are preferred for purposes of this invention, it is within the scope of the invention, as pointed out above, to employ other solid propellant binders in our novel propellants as well. For example, resinous binders such as asphalt, rubbers, polysulfides, rubber-polysulfide mixtures, resins, other combustible polymeric organic materials, etc., are all suitable for use in our improved propellants. Examples of combustible polymeric organic materials suitable as propellant binders are phenol-aldehyde resins, polyester resins, acrylate resins, and polyalkylene resins.

Examples of rubber binders which can be employed within the scope of our invention are polyisobutylene, butyl rubber, butadiene-styrene copolymers such as Buna-S, a butadiene-acrylonitrile copolymer such as Buna-N, highly polymerized vinyl alcohols in a plasticized state such as polyvinyl alcohol and chloroprene polymers such as Neoprene. The polysulfides suitable as solid propellant binders are exemplified by the Thiokols produced by Thiokol Corporation. The Thiokols are polyalkylene sulfides such as that resulting from the condensation of ethylene dichloride and sodium tetrasulfide. A more complete description of rubber and polysulfide propellant binders can be found in assignee's copending U.S. Pat. application Ser. No. 637,004, filed Dec. 22, 1945.

The so-called polyester resins suitable for use as solid propellant binders are formed by reacting a polyhydric alcohol with a polycarboxylic acid and copolymerizing therewith a monomeric olefinic component such as a vinyl, allyl, or other olefin compatible with the resin. To permit heteropolymerization between the polyester and olefin components, the polyesters are provided with some unsaturation through the incorporation therein of unsaturated polycarboxylic acid or anhydride and/or unsaturated polyhydric alcohol.

Saturated polycarboxylic acids useful in compounding the polyester resins are, for example, the aliphatic dibasic acids, including oxalic, malonic, succinic, glutaric, adipic, pimelic, sebacic, azelaic acid, etc., and the unsaturated carboxylic acids useful as the acidic components in forming polyester resins are maleic acid, fumaric acid, citraconic acid, mesaconic acid, itaconic acid, etc. The anhydrides such as itaconic anhydride and phthalic anhydride may likewise be used for supplying the desired unsaturation.

Regardless of which of the saturated acids are used, the degree of unsaturation necessary to provide cross-linkage with the vinyl, allyl, or other olefinic components may be obtained by the addition of any of the above-named unsaturated acids or their anhydrides.

The alcohols that can be used are not limited to the dihydric alcohols as other polyhydric alcohols such as the trihydric and higher polyhydric alcohols may be used. These afford additional possibilities for cross-linking and as a consequence the toughness and brittleness of the final resin may be controlled as desired.

For the polyhydric alcohol component any of the following alcohols may be used: dihydric alcohols such as ethylene glycol, diethylene glycol, triethylene glycol, propylene glycol, etc.; a trihydric alcohol such as glycerol; tetrahydric alcohols such as the erythritols, pentaerythritols, etc.; pentitols which include arabitol, adonitol, xylitol, etc.; hexitols including mannitol, sorbitol, dulcitol, etc.; heptitols such as persitol, volamitol, etc.; or mixtures of any of the above alcohols may also be employed if desired.

The olefinic component of the polyester resin binders may be styrene; vinyl acetate; acrylic acid esters; methacrylic acid esters; allyl compounds such as allyl diglycol carbonate, diallyl maleat, and diallyl glycolate; and other unsaturated components such as propylene, butadiene, etc.; as well as derivatives of any of the above substances which are capable of polymerization with the resin. In general any olefin which will polymerize with the resin to form a solid grain may be employed; this includes all unsubstituted olefins and in addition many substituted olefins.

The polyester resins suitable as propellant binders and their methods of preparation are more fully disclosed in assignee's U.S. Pat. application Ser. No. 109,409, filed Aug. 9, 1949.

Acrylate resin binders within the scope of this invention comprise copolymers of any two or more reduced oxygen-containing polymerizable monomers such as alkenoic acids, alkenoic acid esters, dialkenyl diglycolates, dialkylene diglycol bis-(alkenyl carbonate), alkenyl phthalates, etc. Examples of reduced oxygen-containing polymerizable monomers suitable for acrylate propellant binder formation are the acrylates and methacrylates such as methyl methacrylate, methyl acrylate, ethyl acrylate, propyl acrylate, butyl acrylate, butyl methacrylate, propyl methacrylate, diethylene glycol bis-(allyl carbonate), glycidol allyl ether, diallyl phthalate, diallyl diglycolate, diallyl maleate, diallyl fumarate, etc.

Other acrylate binders suitable for use in our invention are prepared by copolymerizing polymerizable substances containing unreduced oxygen in the molecule such as the nitro and nitroether-substituted alkenoic acids and esters. Specific examples of nitro-containing monomers which copolymerize to form acrylate propellant binders are 2-nitroethyl acrylate, the nitrobutyl acrylates, 2,2-dinitropropyl acrylate, 2,2,3,3-tetranitrobutyl acrylate, and 2,2,3,3-tetranitrobutyl methacrylate.

Still other acrylate binders comprise copolymers of any one or more of the above-mentioned reduced oxygen containing monomers and any one or more of the above-mentioned monomers containing unreduced oxygen in the molecule. These binders, as well as those acrylate binders referred to above, and their methods of preparation are more fully described in assignee's copending U.S. Pat. application Ser. No. 321,941, filed Nov. 21, 1952.

Polyurethane resins containing unreduced oxygen are suitable binders for the propellants of our invention. Such binders can be prepared by condensing nitro-containing isocyanates and nitro-containing alcohols, as more fully disclosed in assignee's copending U.S. Pat. application Ser. No. 728,491, filed Apr. 14, 1958.

In the preparation of the nitro-substituted polyurethanes of application Ser. No. 728,491, both the alcohol and isocyanate starting materials may contain nitro groups. However, this is not necessary and it is sufficient if the nitro groups are initially present on only an alcohol or isocyanate starting material. The nitro-substituted polyurethanes (hereinafter referred to as nitro-polyurethanes) can be cross-linked or not as desired.

Polyurethane propellants can be prepared with any degree of nitro saturation and all are suitable as propellant binders. It is not necessary to employ an oxidizing salt in nitro-polyurethane propellant grains having sufficient oxygen present in the nitro groups to permit satisfactory burning of the propellant after combustion has been initiated.

Examples of alcohols useful for the preparation of nitro-polyurethane propellant binders are lower alkylene diols such as ethylene glycol, 1,3-propanediol, and 1,2-pentanediol; nitro-alkylene diols such as 2-methyl-2-nitro-1,3-propanediol, 4,4,6,8,8-pentanitro-1,11-undecanediol, 2,2,4,4-tetranitro-1,5-pentanediol, 4,4,-6,6,8,8-hexanitro-1,11-undecanediol, 5,5,5-trinitro-1,2-pentanediol, 5,5-dinitro-1,2-hexanediol, and 2,2-dinitro-1,3-propanediol; nitrazaalkylene diols such as 3-nitraza-1,5-pentanediol, 3,6-dinitraza-1,8-octanediol, and 2-nitraza-1,4-butanediol; and nitrazanitroalkylene diols such as 5-aza-3,3,5,7,7-pentanitro-1,9-nonanediol and 6-aza-3,6-dinitro-1,8-octanediol.

Examples of isocyanates useful as starting materials for the preparation of nitropolyurethane propellant binders are lower alkylene diisocyanates such as methylene diisocyanate, ethylene diisocyanate, and 1,3-propane diisocyanate; nitroalkylene diisocyanates such as 3,3-dinitro-1,5-pentane diisocyanate, 3,3,5,7,7-pentanitro-1,9-nonane diisocyanate, 2,2,4,4-tetranitro-1,5-pentane diisocyanate, and 5,5,5-trinitro-1,2-pentane diisocyanate; nitrazaalkylene diisocyanates such as 3,6-dinitraza-1, 8-octane diisocyanate, 3-nitraza-1,5-pentane diisocyanate, and 2-nitraza-1,4-pentane diisocyanate; and nitrazanitroalkylene diisocyanates such as 5-aza-3,3,5,7,7-pentanitro-1,9-nonane diisocyanate, 6-aza-3,6-dinitro-1,8-octane diisocyanate, and 5-aza-3,3,5-trinitro-1,9-nonane diisocyanate.

Mixtures of any of the above-named alcohols and isocyanates can be polymerized to form propellant binders within the scope of this invention.

Illustrative of other solid propellant binders suitable for use in the novel propellants of our invention are those disclosed in U.S. Pat. No. 2,479,828 and British Pat. No. 579,057.

Still other types of binders suitable for use in our novel solid propellant compositions are nitrocellulose-plasticizer binders of the type prepared by curing mixtures of finely divided nitrocellulose and suitable plasticizers such as pentaerythritol trinitrate. Binders of this type and their methods of preparation are well-known to those skilled in the propellant art.

A finely divided nitrocellulose suitable for use in the preparation of the subject binders is obtained by first dissolving nitrocellulose, preferably prepared from cotton linters, in a solvent such as an ethyl acetate-acetone mixture, an ethyl acetate-ethanol mixture, or nitromethane to form a lacquer. The lacquer is slurried in an aqueous medium containing a suspending agent such as methyl cellulose in combination with an emulsifier such as turkey red oil and an agent to prevent agglomeration such as, for example, sodium chloride as a result of which the nitrocellulose precipitates from the solvent and is recovered as a particulate material having an average particle size of 10–12 microns and an over-all particle size range of from about 1 to about 35 microns. Finely divided nitrocellulose such as that prepared by the above-described method is known to those skilled in the art as plastisol grade nitrocellulose and will be hereinafter referred to as such. Plastisol grade nitrocellulose is readily available on the open market from E. I. DuPont deNemours & Co., Inc., of Wilmington, Del.

A variety of plasticizers are suitable for use in the preparation of the subject binders, the preferred one being pentaerythritol trinitrate. It is not necessary, however, that the plasticizer be a high energy compound such as a nitrate ester and so-called inert plasticizers such as dibutyl phthalate as well as mixtures of high energy and inert plasticizers can be employed in the preparation of solid propellant binders based on nitrocellulose of the type under present consideration. Examples of other plasticizers known by those skilled in the art to be useful for the instant purpose are nitroglycerin, diethylene glycol dinitrate, diethyl phthalate, trimethylolethane trinitrate, triethylene glycol dinitrate, dinitropropyl nitrazapentanoate, dinitropropyl sulfide, trimethylol hydroxymethane trinitrate, trimethylol propane trinitrate, trimethylol nitromethane trinitrate, and ethylene glycol dinitrate. The use of any mixture of suitable plasticizers in the preparation of nitrocellulose based binders for our novel propellants is, of course, within the scope of our invention.

It is not felt necessary to describe the nitrocellulose based binders in any greater detail than that given above since, as already indicated, such binder systems are known to the trade and, hence, their preparation for purposes of this invention would pose no problems to those skilled in the art.

Although some significant improvement in specific impulse accrues from the presence of any amount of aluminum in excess of about 5 percent in our novel propellants, we have found the preferred quantities of aluminum to be those within the range from about 11 to about 26 percent by weight of the propellant. When the amount of aluminum exceeds about 26 percent there is normally a tendency for the specific impulse to drop but there is a desirable increase in density which in some cases more than off-sets the disadvantage of decreased specific impulse.

In amounts greater than about 40 percent by weight, the aluminum normally serves little if any beneficial purpose in those propellants of our invention incorporating our preferred polyurethane binders. This is due to the fact that as the quantity of aluminum is increased beyond about 40 percent the propellant stoichiometry becomes such that sufficient oxygen is no longer available for complete reaction of the aluminum and the resultant performance of the propellant suffers to such an extent that no practical advantage is to be gained from the presence of the aluminum in the system. There are, of course, propellants within the scope of our invention where the incorporation of more than 40 percent aluminum would not be subject to the above objection such as, for example, propellants for hybrid systems employing a liquid oxidizer. In propellants such as this the aluminum content may, of course, exceed 40 percent of the total propellant weight and still serve the beneficial purpose for which it was intended.

As the quantity of aluminum in our novel propellants falls below about 11 percent, the increased specific impulse benefit becomes less and less significant until at relatively low quantities, such as those below about 5 percent by weight, it is relatively negligible.

The proportions of the ingredients which go to make up the binder can vary through wide ranges, depending on the properties desired in the propellant and the specific reactants employed. Although stoichiometric proportions of hydroxy and isocyanate components can be employed in the preparation of our novel solid propellants, we have found that a product of improved mechanical properties is obtained if a slight excess of isocyanate groups over hydroxy groups is present in the fuel mixture. Consequently, for the best results we have found that there should be from about 100 to about 115 equivalents of isocyanate or isothiocyanate containing monomer in the fuel mixture for every 100 equivalents of hydroxy or thiol containing monomer therein.

There can, of course, be more than one isocyanate compound or equivalent, as well as more than one hydroxy compound or equivalent, in the fuel mixture, in which case the calculation of excess isocyanate over hydroxy groups is based upon the total amounts of all pertinent compounds present. For example, where the cross-linker is a polyhydroxy compound the excess of isocyanate compound (or equivalent) is calculated as an excess over the amount of diol (or its equivalent) plus the amount of cross-linker. The relative proportions of diol and cross-linker can vary through wide ranges so long as a cross-linked structure is obtained in the fuel.

The various additives and minor components of our novel propellants (those ingredients other than the urethane and cross-linker reactants and the aluminum) normally comprise a very small percentage of the total propellant weight. Thus, they will usually be present in combined amount not greater than that corresponding to about 10 percent (and more often about 4 or 5 percent) of the total propellant weight.

The following examples are included for purposes of illustrating the novel process and propellant compositions of our invention. Applicants wish to emphasize that these examples are intended for illustrative purposes only and that they should not be construed as limitative of the scope of the invention to the particular conditions and embodiments set forth therein.

EXAMPLE I

This example describes a particular method of preparing a novel propellant composition according to this invention from the following ingredients:

| INGREDIENT | WEIGHT PERCENT |
|---|---|
| Ammonium perchlorate | 65.00 |
| Aluminum | 13.00 |
| Copper chromite (CuO202) | 0.50 |
| Phenyl betanaphthylamine | 0.20 |
| Ferric acetylacetonate | 0.08 |
| Glycerol monoricinoleate | 1.08 |
| Polypropylene glycol 2025* | 13.76 |
| Dioctyl azelate | 4.20 |
| Lecithin | 0.12 |
| Atlas G-2684** | 0.08 |
| Tolylene diisocyanate | 1.98 |
| | 100.00 |

*Manufacturer's designation indicating the value of the molecular weight.
**A mixture of sorbitan monooleate and polyoxyethylene esters of mixed fatty and resin acids manufactured by Atlas Powder Company.

The ammonium perchlorate oxidizer is stored at 110°F in a closed vinyl bag, for 48 hours, prior to the propellant mixing operation.

The aluminum powder is stirred into about one-third of the required volume of polypropylene glycol and glycerol monoricinoleate. The mixture is prepared in a stainless steel container, using a copperberyllium spatula. Mixing is continued for about 10 minutes.

The aluminum slurry is added to a conventional mixer equipped with facilities for heating, cooling, and vacuumizing the propellant mix. The walls of the aluminum slurry container are scraped thoroughly. The container is rinsed with one-half of the required volume of dioctyl azelate and the rinses are added to the mixer. The remaining polypropylene glycol is added to the mixer. The G-2684 wetting agent is mixed with the remaining dioctyl azelate until homogeneous and the solution is then added to the mixer.

With the mixer off, the ferric acetylacetonate, phenyl betanaphthylamine, and lecithin are added through a 40-mesh screen. The copper chromite is added to the mixer.

The mixer is covered and mixed by remote control for 15 minutes under 26–28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70°F under 26 inches vacuum by remote control. The mixer is stopped and the vacuum released with dry nitrogen. The tolylene diisocyanate is added, after which the mass is mixed for ten minutes at 70°F and 26 inches of vacuum by remote control. The vacuum is then released with dry nitrogen and the mixture is cast.

Following are other propellant formulations from which propellant grains are prepared according to methods which are similar to that described in Example I.

EXAMPLE II

| INGREDIENT | WEIGHT PERCENT |
|---|---|
| Ammonium perchlorate | 65.00 |
| Aluminum | 15.00 |
| Phenyl betanaphthylamine | 0.20 |
| Adiprene L* (cross-linking agent) | 10.36 |
| Dioctyl azelate | 6.86 |
| Lecithin | 0.20 |
| Castor oil (glycerol triricinoleate) | 1.86 |
| Methylene-bis-(orthochloroaniline) | 0.52 |
| | 100.00 |

*Adiprene L is the trade name of a prepolymer of polybutylene glycol and tolylene diisocyanate produced and sold by E. I. DuPont deNemours & Co., Inc., of Wilmington, Delaware, having a molecular weight of about 1000 and having the following general formula:

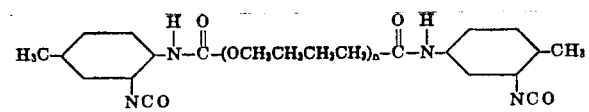

wherein n is a whole number.

EXAMPLE III

| INGREDIENT | WEIGHT PERCENT |
|---|---|
| Ammonium perchlorate | 67.00 |
| Aluminum | 11.00 |
| N-N',di-β-naphthyl-P-phenylenediamine | 0.20 |
| Lecithin | 0.20 |
| Adiprene L | 14.90 |

EXAMPLE III-Continued

| INGREDIENT | WEIGHT PERCENT |
|---|---|
| Castor oil (glycerol triricinoleate) | 6.70 |
| | 100.00 |

EXAMPLE IV

| INGREDIENT | WEIGHT PERCENT |
|---|---|
| Ammonium perchlorate | 63.50 |
| Aluminum | 16.50 |
| Phenyl betanaphthylamine | 0.20 |
| Carbon black (P-33) | 0.20 |
| Ferric acetylacetonate | 0.08 |
| Tween 21* (wetting agent) | 0.22 |
| Polypropylene glycol 2025 | 12.31 |
| Niax LHT-240** (cross-linking agent) | 1.34 |
| Tolylene diisocyanate | 1.78 |
| Dioctyl azelate | 3.87 |
| | 100.00 |

*A polyoxyethylene-sorbitan monolameate product of Atlas Powder Co., Wilmington, Delaware.
**Polypropylene glycol initiated with 1,2,6-hexanetriol, a product of Union Carbide & Carbon Co.

EXAMPLE V

| INGREDIENT | WEIGHT PERCENT |
|---|---|
| Ammonium perchlorate | 62.00 |
| Aluminum | 18.00 |
| Carbon black (P-33) | 0.20 |
| Copper chromite (Cu0202) | 0.50 |
| Phenyl betanaphthylamine | 0.20 |
| Lecithin | 0.20 |
| Polybutylene glycol, Teracol-30 | 12.01 |
| Dioctyl azelate | 4.72 |
| Tolylene diisocyanate | 1.27 |
| Glycerol monoricinoleate | 0.90 |
| | 100.00 |

EXAMPLE VI

| INGREDIENT | WEIGHT PERCENT |
|---|---|
| Lithium perchlorate | 68.00 |
| Aluminum | 10.00 |
| Carbon black (P-33) | 0.50 |
| Phenyl betanaphthylamine | 0.20 |
| Lecithin | 0.14 |
| Ferric acetylacetonate | 0.10 |
| Polypropylene glycol 2025 | 18.40 |
| Monohydroxyethyltrihydroxypropylenediamine | 0.34 |
| Tolylene diisocyanate | 2.32 |
| | 100.00 |

EXAMPLE VII

| INGREDIENT | WEIGHT PERCENT |
|---|---|
| Ammonium perchlorate | 63.20 |
| Aluminum | 19.00 |
| Phenyl betanaphthylamine | 0.20 |
| Lecithin | 0.20 |
| Ferric acetylacetonate | 0.06 |
| Isodecylpelargonate | 4.34 |
| Polypropylene glycol 2025 | 10.18 |
| Castor oil (glycerol triricinoleate) | 0.80 |
| Niax LHF-240 | 0.56 |
| Tolylene diisocyanate | 1.46 |
| | 100.00 |

EXAMPLE VIII

| INGREDIENT | WEIGHT PERCENT |
|---|---|
| Ammonium perchlorate | 66.00 |
| Aluminum | 10.00 |
| Phenyl betanaphthylamine | 0.20 |
| Ferric acetylacetonate | 0.06 |
| Tween 21 | 0.20 |
| Isodecylpelargonate | 5.89 |
| Polypropylene glycol 2025 | 13.40 |
| Polybutylene glycol 3000* | 1.10 |
| Niax LHT-240 | 1.05 |
| Triethanolamine | 0.06 |
| Tolylene diisocyanate | 2.04 |
| | 100.00 |

*Molecular weight

EXAMPLE IX

| INGREDIENT | WEIGHT PERCENT |
|---|---|
| Ammonium perchlorate | 75.00 |
| Aluminum | 10.00 |
| Lecithin | 0.20 |
| Phenyl betanaphthylamine | 0.20 |
| Ferric acetylacetonate | 0.05 |
| Polypropylene glycol 2025 | 11.98 |
| Glycerol monoricinoleate | 0.85 |
| Tolylene diisocyanate | 1.72 |
| | 100.00 |

EXAMPLE X

| INGREDIENT | WEIGHT PERCENT |
|---|---|
| Ammonium perchlorate | 72.00 |
| Aluminum | 8.00 |
| Phenyl betanaphthylamine | 0.20 |
| Lecithin | 0.20 |
| Ferric acetylacetonate | 0.10 |
| Polypropylene glycol 2025 | 13.50 |
| Trimethylolpropane | 0.27 |
| Hexamethylene diisocyanate | 1.83 |
| Isodecylpelargonate | 3.90 |
| | 100.00 |

EXAMPLE XI

| INGREDIENT | WEIGHT PERCENT |
|---|---|
| Ammonium perchlorate | 60.00 |
| Aluminum | 25.00 |
| Phenyl betanaphthylamine | 0.20 |
| Lecithin | 0.20 |
| Ferric acetylacetonate | 0.05 |
| Polypropylene glycol 3000 | 9.30 |
| Castor oil (glycerol triricinoleate) | 0.95 |
| Tolylene diisocyanate | 1.40 |
| Isodecylpelargonate | 2.90 |
| | 100.00 |

EXAMPLE XII

| INGREDIENT | WEIGHT PERCENT |
|---|---|
| Ammonium perchlorate | 75.00 |
| Aluminum | 5.00 |
| Phenyl betanaphthylamine | 0.20 |
| Lecithin | 0.20 |
| Polybutylene glycol 3000 | 3.78 |
| Polypropylene glycol 2025 | 9.31 |
| Hexanetriol | 0.33 |
| Hexamethylene diisocyanate | 2.22 |
| Dioctyl azelate | 3.91 |
| Ferric acetylacetonate | 0.05 |
| | 100.00 |

EXAMPLE XIII

| Ingredient | Weight percent |
|---|---|
| Ammonium nitrate | 65.00 |
| Aluminum | 15.00 |
| N-N',diphenyl-P-phenylenediamine* | 0.50 |
| $\left[ \begin{array}{ccc} CH_3 & CH_3 & CH_3 \\ \| & \| & \| \\ CH_3C=CHCH_2CH_2C=CHCH_2CH_2C=CH-CH_2- \end{array} \right]_2$** | 2.00 |
| Lecithin | 0.10 |
| Priminox 10 | 0.10 |
| Sorbitan trioleate (wetting agent) | 0.20 |
| Ferric acetylacetonate | 0.05 |
| Adiprene L | 12.88 |
| Glycerol triricinoleate | 4.76 |
| Dioctyl azelate | 4.41 |
| Total | 100.00 |

*Antioxidant.   **Plasticizer.

EXAMPLE XIV

| INGREDIENT | WEIGHT PERCENT |
|---|---|
| Ammonium perchlorate | 48.00 |
| Nitroguanidine | 15.00 |
| Aluminum (Alcoa 120) | 10.00 |
| Calcium oxalate (burning rate additive) | 2.00 |
| N-N',diphenyl-P-phenylenediamine | 0.25 |
| Ferric acetylacetonate | 0.10 |
| Sorbitan trioleate | 0.20 |
| Lecithin | 0.20 |
| L-45 | 0.01 |
| Trioctyl phosphate (plasticizer) | 4.85 |
| Polypropylene glycol 2025 | 13.94 |
| Glycerol monoricinoleate | 2.56 |
| Tolylene diisocyanate | 2.89 |
| | 100.00 |

EXAMPLE XV

| INGREDIENT | WEIGHT PERCENT |
|---|---|
| Ammonium perchlorate | 35.00 |
| Ammonium nitrate | 35.00 |
| Aluminum | 10.00 |
| Polypropylene glycol 2025 | 12.18 |
| Glycerol monoricinoleate | 1.49 |
| Dioctyl azelate | 3.93 |
| Tolylene diisocyanate | 2.05 |
| Ferric acetylacetonate | 0.05 |
| Phenyl betanaphthylamine | 0.20 |
| Lecithin | 0.10 |
| | 100.00 |

EXAMPLE XVI

This example is a description of the preparation of a propellant according to our invention in which the binder was a nitrocellulose-plasticizer material. The composition of the propellant was as follows:

| INGREDIENT | WEIGHT PERCENT |
| --- | --- |
| Plastisol grade nitrocellulose* | 15 |
| Pentaerythritol trinitrate | 35 |
| Aluminum | 15 |
| Ammonium perchlorate | 35 |
| | 100 |

*Having a nitrogen content of about 12 percent.

The pentaerythritol trinitrate was placed in a conventional mixer equipped with facilities for heating, cooling, and vacuumizing the propellant batch and the mixer was then started. The aluminum was added and the mixture was mixed while a vacuum was pulled on it for 6 to 8 minutes. At that time the mixer was stopped, the ammonium perchlorate was introduced, and the mixing was continued again under vacuum for 6 to 8 minutes. At the end of that time the mixture was cooled down to below 68°F and the nitrocellulose was introduced. The nitrocellulose was dry, the moisture content being under 0.19 percent. The entire mixture was mixed for 8 to 10 minutes again while the vacuum was being pulled on it. At the end of this time the mixture was soupy and was vacuum cast from the mixer and cured to form the final propellant.

It will be apparent that a great number and variety of solid propellants within the scope of this invention can be prepared according to the method taught herein. As indicated above, the essence of our invention resides in the incorporation of aluminum in solid propellants in amounts not less than that equal to about 5 percent by weight, on a total propellant weight basis, to obtain propellant grains exhibiting substantially higher specific impulses than the propellants heretofore known and similar to ours but containing no aluminum. Other benefits, as set forth above, also accrue from the use of aluminum as a propellant additive according to this invention.

The high specific impulse claimed in this invention through the use of aluminum metal in solid propellants is attained by utilizing the large amount of heat produced by oxidation of aluminum in propellant stoichiometries which will result in the formation of a large amount of low molecular weight gas on combustion.

The heat liberated in the formation of $Al_2O_3$ in the liquid state at 298°K is 373 kcal/100 grams. This value is considerably greater than that liberated in the oxidation of a comparable amount of typical solid propellant binder. Consequently, by including aluminum metal in a polymeric fuel-plus-oxidizer system, the total amount of heat released on combustion may be considerably increased.

In addition, solid propellants may be formulated with aluminum to produce combustion products consisting of $Al_2O_3$, $CO$, $H_2$, $N_2$, and $HCl$. Detailed calculations have shown that maximum performance is obtained with mixtures having this stoichiometric product relationship. With stoichiometries less oxidized, free aluminum metal will be formed and the amount of heat produced is thereby considerably reduced. Conversely with stoichiometrics more highly oxidized, $H_2O$ and $CO_2$ will be formed with a subsequent increase in the mean molecular weight of the exhaust gas and a corresponding decrease in specific impulse.

As specific impulse is a direct function of the square root of the difference in enthalpy of the gases between the chamber and exhaust conditions and also inversely proportional to the square root of the mean molecular weight of the gas generated, it is apparent that maximum performance in a given case is attained when the heat liberated is maximum and the mean molecular weight of the gas is minimum. This condition is achieved with the addition of aluminum metal in that a large amount of heat is produced during oxidation and the reaction mixtures can be adjusted to produce considerable $H_2$ gas thereby affecting a significant reduction in the mean molecular weight of the exhaust gas. Relatively high specific impulse can be attained in this manner using a wide range of aluminum-binder-oxidizer combinations as the formulation of systems oxidized beyond the $Al_2O_3$-$CO$-$H_2$ stoichiometry results in no significant reduction in heat liberated and, unless significantly higher oxidized, in only slight increase in molecular weight of gas.

We claim:

1. A solid substantially homogeneous propellant composition which comprises a cured intimate mixture of finely divided aluminum which is uniformly dispersed throughout said propellant composition, a solid inorganic oxidizing salt, and a polyurethane resin binder which comprises the reaction product of an aromatic diisocyanate, a polyether having a molecular weight between about 400 and about 10,000, and a trihydroxy cross-linker compound; the aluminum being present in an amount between about 5 and about 40 percent by weight, the resin binder being present in an amount between about 40 and about 10 percent by weight, and the solid inorganic oxidizing salt being present in an amount between about 85 and about 40 percent by weight, all percentages being given on a total propellant weight basis.

2. The solid substantially homogeneous propellant composition of claim 1 wherein the aromatic diisocyanate is present in stoichiometric excess, the stoichiometric excess having been calculated as an excess over the amounts of polyether and trihydroxy compounds initially present.

3. A solid substantially homogeneous propellant composition which comprises a cured intimate mixture of finely divided aluminum which is uniformly dispersed throughout said propellant composition, a solid inorganic oxidizing salt, and a polyurethane resin binder which comprises the reaction product of an aromatic diisocyanate, a polyether having a molecular weight between about 400 and about 10,000 and, as a cross-linker, glycerol monoricinoleate; the aluminum being present in an amount between about 5 and about 40 percent by weight, the resin binder being present in an amount between about 40 and about 10 percent by weight, the inorganic oxidizing salt being present in an amount between about 85 and about 40 percent by weight, all percentages being given on a total propellant weight basis, and the aromatic diisocyanate being present in stoichiometric excess, the stoichiometric excess having been calculated as an excess over the amounts of polyether and glycerol monoricinoleate initially present.

4. A substantially homogeneous solid propellant composition which comprises a cured intimate mixture of finely divided aluminum which is uniformly dispersed throughout said propellant composition, a solid inorganic oxidizing salt, and a polyurethane resin binder which comprises the reaction product of 2,4-tolylene diisocyanate, polypropylene glycol having a molecular weight of from about 2,000 to about 3,000, and glycerol monoricinoleate; the aluminum being present in an amount between about 5 and about 40 percent by weight, the resin binder being present in an amount between about 40 and about 10 percent by weight, and the solid inorganic oxidizing salt being present in an amount between about 85 and about 40 percent by weight, all percentages being given on a total propellant weight basis.

5. A substantially homogeneous solid propellant composition which comprises a cured intimate mixture of finely divided aluminum which is uniformly dispersed throughout said propellant composition, a solid inorganic oxidizing salt, and a polyurethane resin binder which comprises the reaction product of 2,4-tolylene diisocyanate, polypropylene glycol having a molecular weight of from about 2,000 to about 3,000, and glycerol monoricinoleate; the aluminum being present in an amount between about 5 and about 40 percent by weight, the resin binder being present in an amount between about 40 and about 10 percent by weight, the inorganic oxidizing salt being present in an amount between about 85 and about 40 percent by weight, all percentages being given on a total propellant weight basis, and the 2,4-tolylene diisocyanate being present in stoichiometric excess, the stoichiometric excess having been calculated as an excess over the amounts of polypropylene glycol and glycerol monoricinoleate initially present.

6. The solid substantially homogeneous propellant composition of claim 4 wherein the aluminum is present in an amount between about 11 and about 26 percent by weight of the propellant composition.

7. A solid substantially homogeneous propellant composition which comprises from about 85 percent to about 40 percent of a cured intimate mixture of a solid inorganic oxidizing salt; from about 10 percent to about 40 percent of a polyurethane resin binder which comprises the reaction product of a compound having two active hydrogen groups capable of polymerizing with an isocyanate selected from the group consisting of:
  a. alkane diols having a chain-length of from two to 20 carbon atoms, inclusive;
  b. alkane dithiols having a chain-length of from two to 20 carbon atoms;
  c. alkene diols;
  d. alkene dithiols;
  e. cycloalkylene diols;
  f. cycloalkylene dithiols;
  g. aromatic diols;
  h. aromatic dithiols;
  i. dihydroxy polyesters having a molecular weight from about 1000 to about 2,500;
  j. polyalkylene ether glycols having a molecular weight from about 400 to about 10,000;
  k. polysulfides with glycol end groups; and mixtures thereof; a compound selected from the group consisting of:
    1. alkane diisocyanates;
    2. alkane diisothiocyanates;
    3. alkene diisocyanates;
    4. alkene diisothiocyanates;
    5. alkylidene diisocyanates;
    6. alkylidene diisothiocyanates;
    7. cycloalkylene diisocyanates;
    8. cycloalkylene diisothiocyanates;
    9. cycloalkylidene diisocyanates;
    10. cycloalkylidene diisothiocyanates;
    11. aromatic diisocyanates;
    12. aromatic diisothiocyanates; and mixtures thereof;

and, as a cross-linking agent, a compound having as its sole reacting groups, not less than three groups polymerizable with a radical selected from the group consisting of hydroxy, thiol, isocyanate, and isothiocyanate groups, and finely divided aluminum which is uniformly dispersed throughout said propellant composition and being present in an amount of from about 5 percent to about 40 percent by weight of the total propellant composition.

8. The solid substantially homogeneous propellant composition of claim 7 wherein the inorganic oxidizing salt is ammonium perchlorate.

9. The solid substantially homogeneous propellant composition of claim 7 wherein the inorganic oxidizing salt is ammonium nitrate.

10. The solid substantially homogeneous propellant composition of claim 7 wherein the inorganic oxidizing salt is potassium perchlorate.

11. The solid substantially homogeneous propellant composition of claim 7 in which there is intimately dispersed an amount not greater than about 2 percent by weight of the propellant composition of a burning rate additive.

12. The solid substantially homogeneous propellant composition of claim 7 in which there is intimately dispersed an amount of carbon black not greater than about 2 percent by weight of the propellant composition as a burning rate additive.

13. The solid substantially homogeneous propellant composition of claim 7 in which ther is intimately dispersed an amount of copper chromite not greater than about 2 percent by weight of the propellant composition as a burning rate additive.

14. The solid substantially homogeneous propellant composition of claim 7 in which there is intimately dispersed an amount not greater than about 2 percent by weight of the propellant composition of a mixture of finely divided carbon black and copper chromite.

15. A solid substantially homogeneous propellant composition according to claim 7 wherein the particle size of the aluminum is less than about 25 $\mu$.

16. A solid substantially homogeneous propellant composition consisting essentially of a cured intimate mixture of a solid inorganic oxidizing salt, a cross-linked polyurethane resin binder which comprises the reaction product of a compound having as its sole reacting groups not less than two active hydrogen groups capable of polymerizing with an isocyanate, said active hydrogen groups being selected from the class consisting of hydroxy and thiol groups, and a compound having as its sole reacting groups not less than two groups capable of undergoing a urethane-type reaction with hydroxy groups, said groups capable of undergoing a urethane-type reaction being selected from the group consisting of isocyanate and isothiocyanate groups; and finely divided aluminum which is uniformly dispersed throughout said propellant composition and being present in amount of from about 5 percent to about 40 percent by weight of the total propellant composition.

17. A solid substantially homogeneous propellant composition which comprises a cured intimate mixture of from about 85 percent to about 40 percent of a solid inorganic oxidizing salt, from about 10 percent to about 40 percent of a cross-linked polyurethane resin binder which comprises the reaction product of a compound having as its sole reacting groups not less than two active hydrogen groups capable of polymerizing with an isocyanate, said active hydrogen groups being selected from the group consisting of hydroxy and thiol groups; and a stoichiometric excess of a compound having as its sole reacting groups not less than two groups capable of undergoing a urethane-type reaction with hydroxy groups, the groups capable of undergoing a urethane-type reaction being selected from the group consisting of isocyanate and isothiolcyanate groups, the stoichiometric excess being calculated as an excess over all other hydrogen groups capable of polymerizing with an isocyanate initially present, and finely divided aluminum which is uniformly dispersed throughout said propellant composition and being present in an amount of from about 5 percent to about 40 percent by weight of the total propellant composition.

18. The solid substantially homogeneous propellant composition of claim 17, wherein the stoichiometric excess of reactant material containing groups capable of undergoing a urethane-type reaction with hydroxy groups over the reactant material containing active hydrogen groups capable of polymerizing with an isocyanate corresponds to a proportion of from about 100 to about 115 equivalents of the former for every 100 equivalents of the latter.

19. The solid substantially homogeneous propellant composition of claim 7 wherein the polyurethane resin binder comprises the reaction product of a stoichiometric excess of the compound selected from the group consisting of:
  1. alkane diisocyanates;
  2. alkane diisothiocyanates;
  3. alkene diisocyanates;
  4. alkene diisothiocyanates;
  5. alkylidene diisocyanates;
  6. alkylidene diisothiocyanates;
  7. cycloalkylene diisocyanates;
  8. cycloalkylene diisothiocyanates;
  9. cycloalkylidene diisocyanates;
  10. cycloalkylidene diisothiocyanates;
  11. aromatic diisocyanates;
  12. aromatic diisothiocyanates; and mixtures thereof;

the stoichiometric excess being calculated as an excess over the combined equivalents of the compound having two hydrogen groups capable of polymerizing with an isocyanate and a cross-linking agent.

20. The solid substantially homogeneous propellant composition of claim 7 wherein the polyurethane resin binder comprises the reaction product of from about 100 to about 115 equivalents of the compound selected from the group consisting of:
  1. alkane diisocyanates;
  2. alkane diisothiocyanates;
  3. alkene diisocyanates;
  4. alkene diisothiocyanates;
  5. alkylidene diisocyanates;
  6. alkylidene diisothiocyanates;
  7. cycloalkylene diisocyanates;
  8. cycloalkylene diisothiocyanates;
  9. cycloalkylidene diisocyanates;
  10. cycloalkylidene diisothiocyanates;
  11. aromatic diisocyanates;
  12. aromatic diisothiocyanates; and mixtures thereof;

for every 100 equivalents of the compound having two active hydrogen groups capable of polymerizing with an isocyanate plus the cross-linking agent.

21. The method of preparing a solid substantially homogeneous propellant composition which comprises intimately and uniformly dispersing from about 85 percent to about 40 percent of a solid inorganic oxidizing salt and from about 5 percent to about 40 percent finely divided aluminum in from about 10 percent to about 50 percent by weight of a polyurethane binder mixture comprising a compound having two active hydrogen groups capable of reacting with an isocyanate selected from the group consisting of:
  a. alkane diols having a chain length of from 2 to 20 carbon atoms, inclusive;
  b. alkane dithiols having a chain length of from 2 to 20 carbon atoms;
  c. alkene diols;
  d. alkene dithiols;
  e. cycloalkylene diols;
  f. cycloalkylene dithiols;
  g. aromatic diols;
  h. aromatic dithiols;
  i. dihydroxy polyesters having a molecular weight from about 1000 to about 2500;
  j. polyalkylene ether glycols having a molecular weight from about 400 to about 10,000;
  k. polysulfides with glycol end groups; and mixtures thereof; a compound selected from the group consisting of:
    1. alkane diisocyanates;
    2. alkane diisothiocyanates;
    3. alkene diisocyanates;
    4. alkene diisothiocyanates;
    5. alkylidene diisocyanates;
    6. alkylidene diisothiocyanates;
    7. cycloalkylene diisocyanates;
    8. cycloalkylene diisothiocyanates;
    9. cycloalkylidene diisocyanates;
    10. cycloalkylidene diisothiocyanates;
    11. aromatic diisocyanates;
    12. aromatic diisothiocyanates; and mixtures thereof;

and, as a cross-linking agent, a compound having not less than 3 groups polymerizable with a group selected from the class consisting of hydroxy, thiol, isocyanate, and isothiocyanate groups; and curing the mixture.

* * * * *